US009072288B1

(12) United States Patent
Thomas (10) Patent No.: US 9,072,288 B1
(45) Date of Patent: Jul. 7, 2015

(54) SOLAR POWERED OWL SYSTEMS

(71) Applicant: Lucy D. Thomas, Fontana, CA (US)

(72) Inventor: Lucy D. Thomas, Fontana, CA (US)

( * ) Notice: Subject to any disclaimer, the term of this patent is extended or adjusted under 35 U.S.C. 154(b) by 284 days.

(21) Appl. No.: 13/716,173

(22) Filed: Dec. 16, 2012

Related U.S. Application Data

(60) Provisional application No. 61/577,478, filed on Dec. 19, 2011.

(51) Int. Cl.
*A01M 29/06* (2011.01)
*A01M 29/16* (2011.01)

(52) U.S. Cl.
CPC ..................... *A01M 29/06* (2013.01)

(58) Field of Classification Search
CPC ..... A01M 29/00; A01M 29/06; A01M 29/10; A01M 29/16; A01M 29/18
USPC .............. 116/22 A; 248/237, 371; 340/573.1, 340/573.2
See application file for complete search history.

(56) References Cited

U.S. PATENT DOCUMENTS

| | | | | | |
|---|---|---|---|---|---|
| 2,576,209 | A | * | 11/1951 | Berger | 40/417 |
| 3,333,802 | A | * | 8/1967 | Goodman | 248/539 |
| 4,497,278 | A | * | 2/1985 | Balder et al. | 119/537 |
| 4,734,074 | A | * | 3/1988 | Kinberg et al. | 446/184 |
| 5,218,927 | A | * | 6/1993 | Addams | 119/537 |
| 5,261,179 | A | * | 11/1993 | Schwinler | 43/1 |
| 5,331,921 | A | * | 7/1994 | vanVonno | 119/537 |
| D384,442 | S | * | 9/1997 | Cirelli | D30/119 |
| 5,788,204 | A | * | 8/1998 | Goodwin et al. | 248/357 |
| 6,920,841 | B2 | | 7/2005 | Meritt | |
| 7,246,569 | B2 | * | 7/2007 | Grandy et al. | 116/22 A |
| 7,290,500 | B2 | * | 11/2007 | Burrell | 119/468 |
| 7,411,504 | B2 | | 8/2008 | Hanscom | |
| 7,884,730 | B2 | | 2/2011 | Alvarado | |
| 7,966,963 | B1 | | 6/2011 | Caldwell et al. | |
| 2006/0185613 | A1 | * | 8/2006 | Burrell | 119/468 |
| 2009/0156091 | A1 | * | 6/2009 | Mankes | 446/353 |

FOREIGN PATENT DOCUMENTS

| | | | | | |
|---|---|---|---|---|---|
| GB | 2282518 | A | * | 4/1995 | ............ A01M 29/00 |
| JP | 11262353 | A | * | 9/1999 | ............ A01M 29/00 |
| JP | 2000041564 | A | * | 2/2000 | ............ A01M 29/00 |
| WO | WO 03059058 | A1 | * | 7/2003 | ............ A01M 29/00 |

* cited by examiner

*Primary Examiner* — R. A. Smith
(74) *Attorney, Agent, or Firm* — RG Patent Consulting, LLC; Rachel Gilboy (57) ABSTRACT

A pest deterrent system including a deterrent assembly having a housing (having a head portion including at least two eyes, at least two ears, and a beak); a body portion; a left wing; a right wing; a left foot; a right foot; at least one motion sensor; at least one speaker; a plurality of illuminators; a powerer; electrical wiring; at least one power storer; an adjustable mounting plate; a plurality of fasteners; an elevated stand assembly (having a crossbar; an elevating-rod; at least one mounting lug; and a through-pin). The deterrent assembly is useful to emit audible sounds via speaker(s), and illumination via the illuminators and appear as a bird of prey such that pests are visually and sound deterred from remaining within a vicinity of a location of the deterrent assembly, the deterrent assembly adjustable, and operated via natural ambient sources.

19 Claims, 6 Drawing Sheets

SOLAR POWERED OWL SYSTEMS

CROSS-REFERENCE TO RELATED APPLICATION

The present application is related to and claims priority from prior provisional application Ser. No. 61/577,478, filed Dec. 19, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of deterrent devices and more specifically relates to a pest deterrent system to scare away birds and other pests.

DESCRIPTION OF THE RELATED ART

Owls are a group of birds that belong to the order Strigiformes, constituting 200 extant bird of prey species. Most are solitary and nocturnal. Owls hunt mostly small mammals, insects, and other birds, although a few species specialize in hunting fish. Owls are characterized by their small beaks and wide faces, and are divided into two families: the typical owls, Strigidae; and the barn-owls, Tytonidae. Owls are birds of prey.

Owls have large forward-facing eyes and ear-holes; a hawk-like beak; a flat face; and usually a conspicuous circle of feathers, a facial disc, around each eye. The feathers making up this disc can be adjusted in order to sharply focus sounds that come from varying distances onto the owls' asymmetrically placed ear cavities. Most birds of prey sport eyes on the sides of their heads, but the stereoscopic nature of the owl's forward-facing eyes permits the greater sense of depth perception necessary for low-light hunting. Although owls have binocular vision, their large eyes are fixed in their sockets—as are those of other birds-so they must turn their entire head to change views. Owls can rotate their heads and necks as much as 270 degrees in either direction. As owls are farsighted, they are unable to see clearly anything within a few centimeters of their eyes. Caught prey can be felt by owls with the use of filoplumes-like feathers on the beak and feet that act as "feelers". Their far vision, particularly in low light, is exceptionally good.

Most owls share an innate ability to fly almost silently and also more slowly in comparison to other birds of prey. Most owls live a mainly nocturnal lifestyle and being able to fly without making any noise gives them a strong advantage over their prey that are listening for any sign of noise in the dark night. A silent, slow flight is not as necessary for diurnal and crepuscular owls given that prey can usually see an owl approaching. While the morphological and biological mechanisms of this silent flight are more or less unknown, the structure of the feather has been heavily studied and accredited to a large portion of why they have this ability.

Serrated edges along the owl's remiges bring the flapping of the wing down to a nearly silent mechanism. Research has shown that the serrations are more likely reducing aerodynamic disturbances, rather than simply reducing noise. The surface of the flight feathers is covered with a velvety structure that absorbs the sound of the wing moving. These unique structures reduce noise frequencies above 2 kHz, making the sound level emitted drop below the typical hearing spectrum of the owl's usual prey and also within the owl's own best hearing range. This optimizes the owl's ability to silently fly in order to capture prey without the prey hearing the owl first as it flies in. It also allows the owl to monitor the sound output from its flight pattern.

Another characteristic of the owl which aids in their nocturnal prey capture is their eyesight. Owls are part of a small group of birds that live nocturnally, but do not use echolocation to guide them in flight in low-light situations. Owls are known for their disproportionately large eyes in comparison to their skull. Instead of moving their eyes, owls swivel their head to visualize their surroundings. The swiveling radius of the owl's head is around 270 degrees, as previously mentioned, easily enabling them to see behind them without relocating the torso. This ability keeps bodily movement at a minimum and thus reduces the amount of sound the owl makes as it waits for its prey. Owls are regarded as having the most frontally placed eyes amongst all avian groups, which gives them some of the largest binocular fields of vision. As such owls are efficient birds of prey which incite fear in the animals they hunt.

Various attempts have been made to solve problems found in a pest deterrent device art. Among these are found in: U.S. Pat. No. 7,966,963 to Caldwell et al; U.S. Pat. No. 7,411,504 to Hanscom; U.S. Pat. No. 7,884,730 to Alvarado; and U.S. Pat. No. 6,920,841 to Meritt. This prior art is representative of pest deterrent devices. None of the above inventions and patents, taken either singly or in combination, is seen to describe the invention as claimed.

Ideally, a pest deterrent system should be safe, effective, and interactive with the pests and, yet would operate reliably and be manufactured at a modest expense. Thus, a need exists for pest deterrent system in the form of an owl having a lifelike hoot and other qualities to scare away birds and other undesirable pests thus, for example, greatly reducing the incidence and accumulation of bird droppings about the residence or other structure and to avoid the above-mentioned problems.

BRIEF SUMMARY OF THE INVENTION

In view of the foregoing disadvantages inherent in the known pest deterrent device art, the present invention provides a novel pest deterrent system. The general purpose of the present invention, which will be described subsequently in greater detail is to provide a pest deterrent system in the form of an owl having lifelike qualities to scare away birds and other pests from remaining around the residence or other protected structure.

The present invention, pest deterrent system, as disclosed herein, preferably comprises: a deterrent assembly including a housing having a head portion including at least two eyes; at least two ears; and a beak; a body portion; a left wing; a right wing; a left foot; a right foot; at least one motion sensor; at least one speaker; a plurality of illuminators; a powerer; electrical wiring; at least one power storer; an adjustable mounting plate; a plurality of fasteners; and an elevated stand assembly (having a crossbar; an elevating-rod; at least one mounting lug; and a through-pin).

The deterrent assembly comprises in combination the housing, the at least one motion sensor, the at least one speaker, the plurality of illuminators, the powerer, the electrical wiring, the at least one power storer, the adjustable mounting plate, and the elevated stand assembly. Further, the deterrent assembly of the pest deterrent system is useful to emit audible sounds via the at least one speaker, and illumination provided via the illuminators (as powered) and the device in its entirety made to appear as the bird of prey such that the pests are visually and sound deterred from remaining within a vicinity of a location of the deterrent assembly. The deterrent assembly may be adjustable, and operated via natural ambient sources in preferred embodiments. Further the device may have the appearance of a bird of prey from many directions such that effectiveness is increased (for example may have 4 sides; 2 sides or more or less).

The housing of the preferred embodiment in combination comprises the head portion, the body portion, the left wing, the right wing, the left foot, and the right foot. As such the housing closely resembles a bird of prey. The bird of prey in preferred embodiments comprises an owl, but may comprise other birds of prey in alternate embodiments. The head portion of the housing comprises the at least two eyes (normally forward-facing), the at least two ears, and the beak resembling the bird of prey such that pests are visually deterred. The head portion of the housing may further comprise a top surface, a front face, a back surface, a front surface, a left side and a right side. The two eyes, and the beak are preferably located on the front face; at least two ears comprise a left ear and a right ear may be found in preferred embodiments; the left ear adjacent the left side and the right ear adjacent the right side. The eyes are illuminatable via the plurality of illuminators. The plurality of illuminators comprise yellow LEDs in preferred embodiments to scare prey. Other colors may be used; however yellow is preferred. The at least one motion sensor may be located on the front surface of the head portion. Illumination may be in pulsed, steady or intermittent light as desired. The head portion rotates 360 degrees or may rotate a portion of that to mimic a 'live' owl, this is useful to scare prey from the front, back and sides of the device, thus covering a larger area of protection. Further this rotatability may be useful for collecting a maximum amount of rays to the solar panel, via strategic positioning throughout the daytime hours. The rotation may be toward a direction from which motion was sensed, thus mimicking a 'live' bird's response. Eyes, ear and other may be located on a back side of the head. Rotation may be provided for the head via known means in the art (bearings or the like).

The at least one motion sensor is useful to send a signal to activate the plurality of illuminators and/or the at least one speaker when motion from the pests is sensed, the at least one speaker able to emit an audible sound and illuminators able to emit light. Where insufficient power is available to power both responses the device may select only one response. The audible sound may comprise a frequency of less than 20,000 Hz wherein a human is able to hear the audible sound emitted from the at least one speaker. The audible sound may comprise a frequency of greater than 20,000 Hz wherein a human is unable to hear the audible sound emitted from the at least one speaker. The audible sound may comprises hoot noises (or other deterrent noises that are suitable to ward off pests) emitted via the speaker.

The powerer provides power for operating the deterrent assembly. The at least one power storer stores the power for operating the deterrent assembly. The powerer is preferably mounted on the top surface of the head portion such as to receive the maximum amount of sun rays. The powerer comprises at least one solar panel. Further, the at least one power storer comprises rechargeable batteries. The electrical wiring allows the at least one power storer to be in electrical communication with the powerer. Those with ordinary skill in the art will now appreciate that upon reading this specification and by their understanding the art of solar powering as described herein, methods of solar power energy capturing, storing and distribution will be understood by those knowledgeable in such art. Prevention means for overcharging of batteries is employed to help insure longevity and serviceability of the product.

The adjustable mounting plate allows the deterrent assembly to be mounted to a planar surface (or non-planar). The planar surface may comprise a horizontal surface (such as a top of a fence or building peak for example) or may comprise a vertical surface such as a wall. Surfaces may comprise a slope. The fasteners are used for removably affixing the adjustable mounting plate to the planar surface. The elevated stand assembly in preferred embodiments comprises in combination the crossbar, the elevating-rod, the at least one mounting lug; and the through-pin. Additionally, the elevating-rod further comprises a swivel. The swivel may comprise a ball and socket or other suitable equivalent such that the housing is manipulatable into a preferred positioning; left foot and the right foot sit in (on) the crossbar to provide stability and user-friendly adjustability and stability for the device. Further, the adjustable mounting plate makes mounting of the device relatively straight-forward. The device can then also be easily moved between locations.

The elevated stand assembly sits above a top surface of the adjustable mounting plate. The at least one mounting lug comprises a through-aperture allowing the through-pin to pass through the elevating-rod, the elevating-rod attached to the crossbar, the crossbar holding the deterrent assembly is an elevated position relative to the adjustable mounting plate. The deterrent assembly is able to be pivoted in relation to the adjustable mounting plate via the elevating-rod, the through-pin able to rotate within the mounting lug(s). The device is also able to be pivoted via the swivel in preferred embodiments. Directional arrows are used to indicate relative motions in the subsequent figures.

A method of use for a pest deterrent system comprises the steps of: turning on a powerer that provides power for operating a deterrent assembly, the deterrent assembly locating (sensing movement of) prey within a vicinity of the location of the deterrent assembly; emitting audible sounds including a hoot (or the like) via at least one speaker and appearing as a bird of prey such that pests are sound deterred from remaining within the vicinity of the location of the deterrent assembly (in response to the sensed movements); providing illumination via illuminators to appear as the bird of prey such that the pests are visually deterred from remaining within the vicinity of the location of the deterrent assembly; and optionally manually turning off the powerer on the deterrent assembly.

The present invention holds significant improvements and serves as a pest deterrent system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pest deterrent system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a pest deterrent device and more particularly to a pest deterrent system in the form of an owl having life-like actions and sounds to scare away birds and other pests such as rodents thus greatly reducing the incidence and accumulation of droppings, filth and mess about the residence or other structure.

Figure 1:
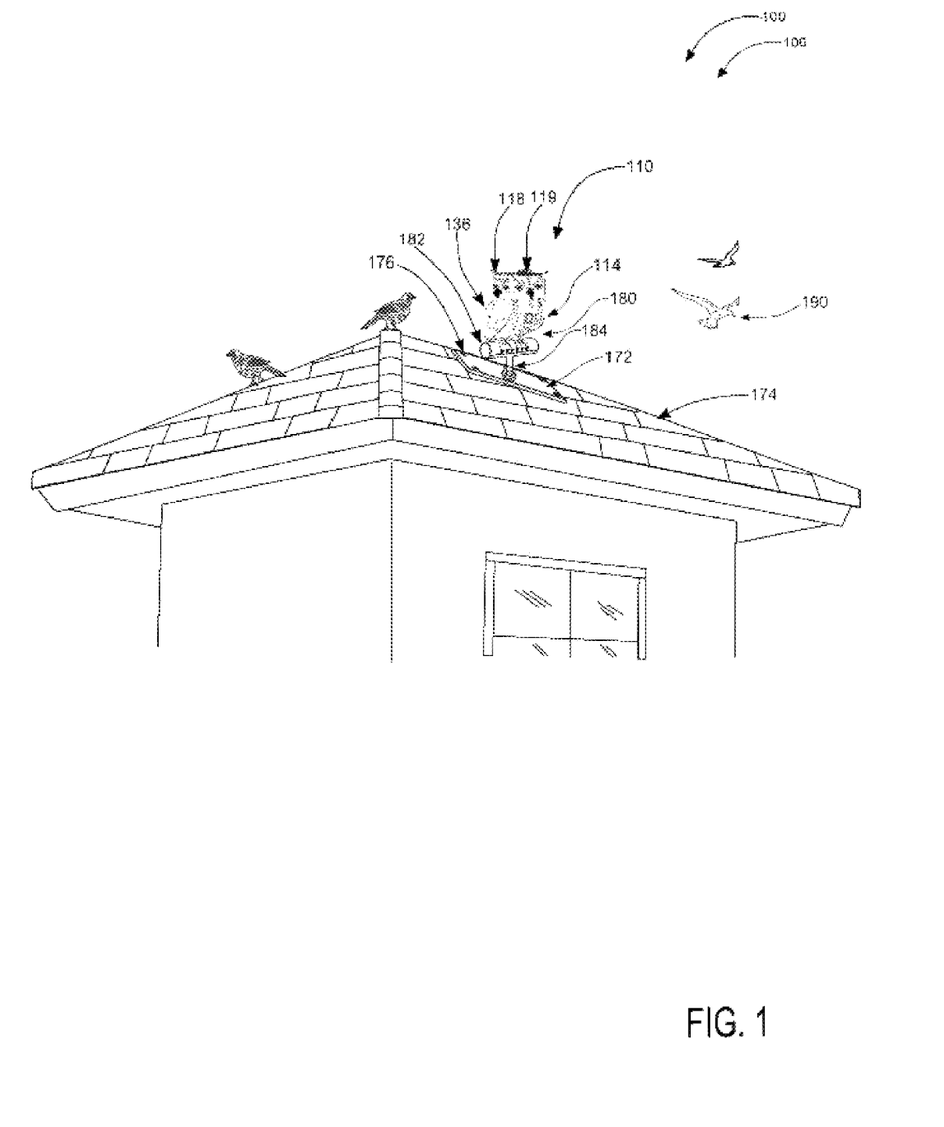
FIG. 1 shows a perspective view illustrating a pest deterrent system in an 'in-use' condition according to an embodiment of the present invention.
Figure 2:
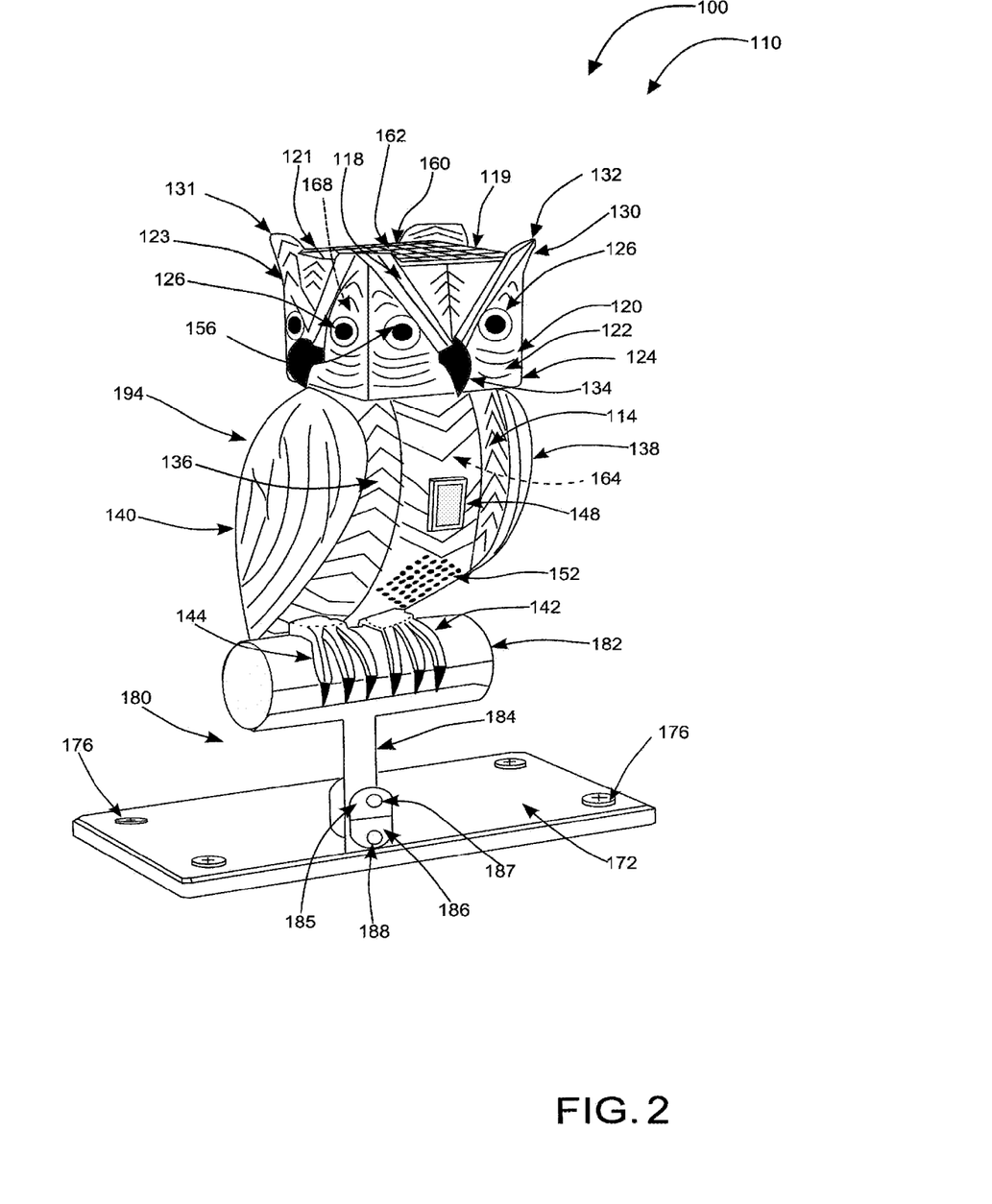
FIG. 2 shows a front perspective view illustrating a deterrent assembly of the pest deterrent system according to an embodiment of the present invention.
Figure 3:
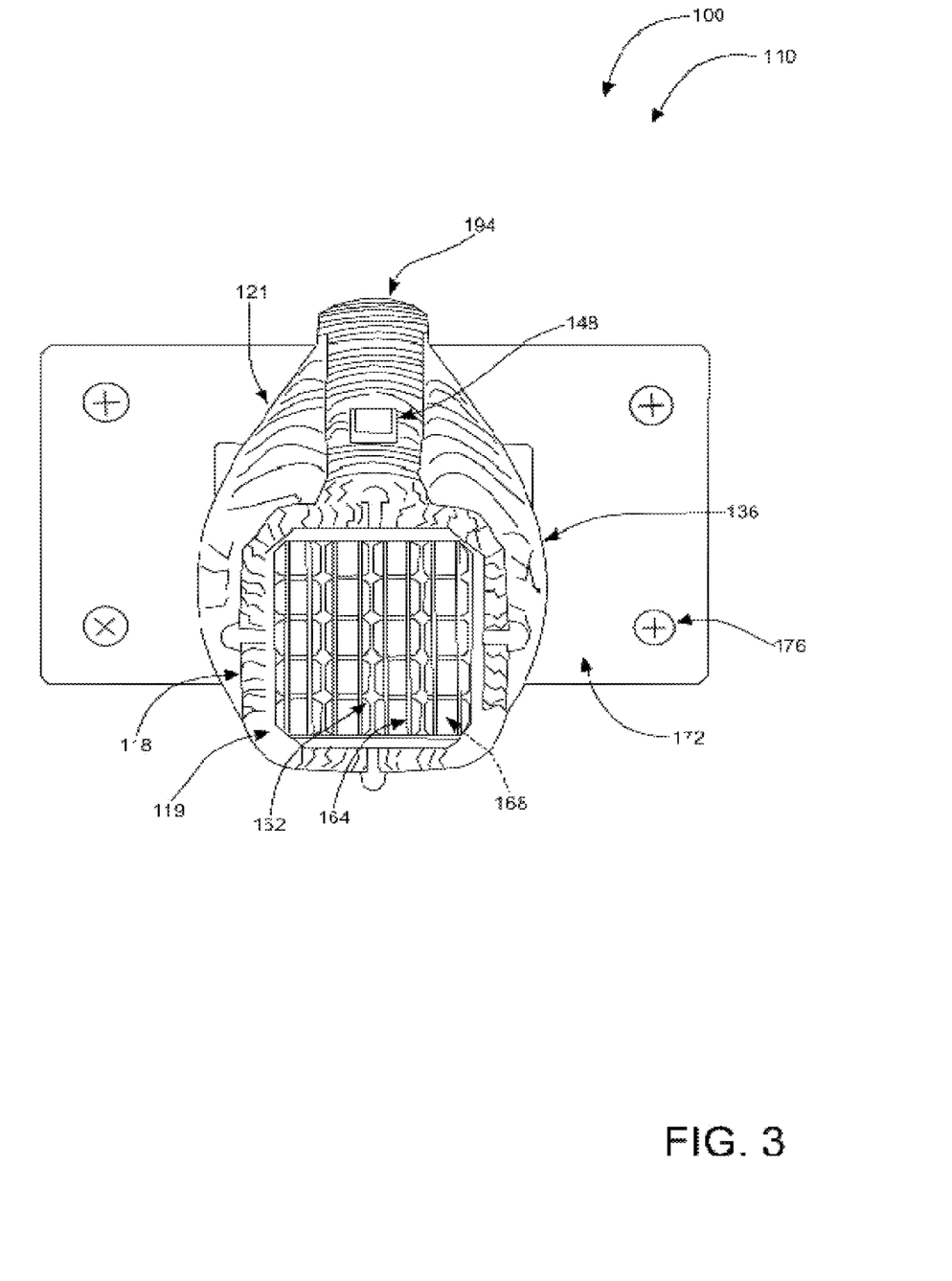
FIG. 3 shows a top perspective view illustrating the deterrent assembly of the pest deterrent system according to an embodiment of the present invention.
Figure 4:
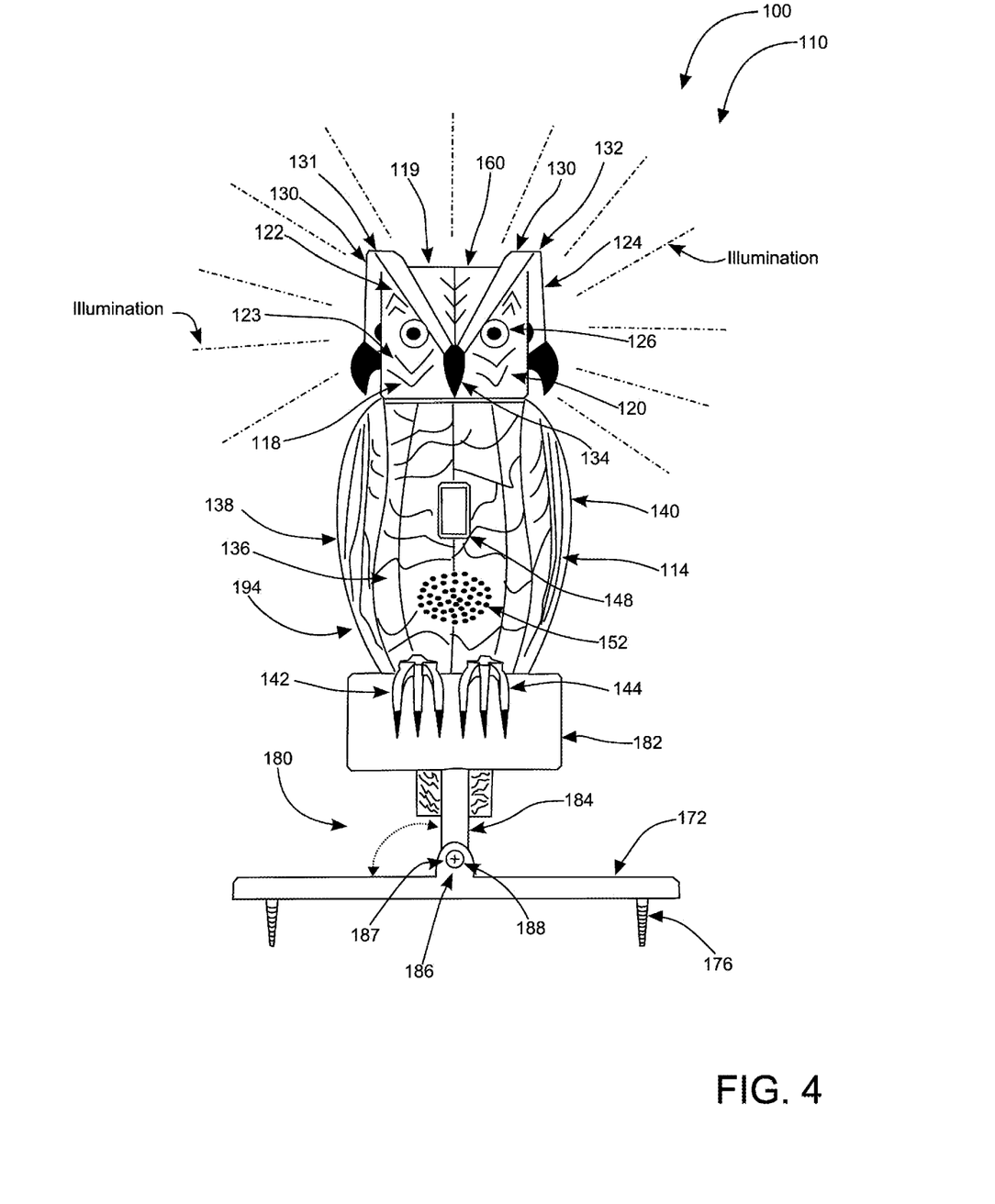
FIG. 4 shows a back perspective view illustrating illuminators of the pest deterrent system according to an embodiment of the present invention.
Figure 5:
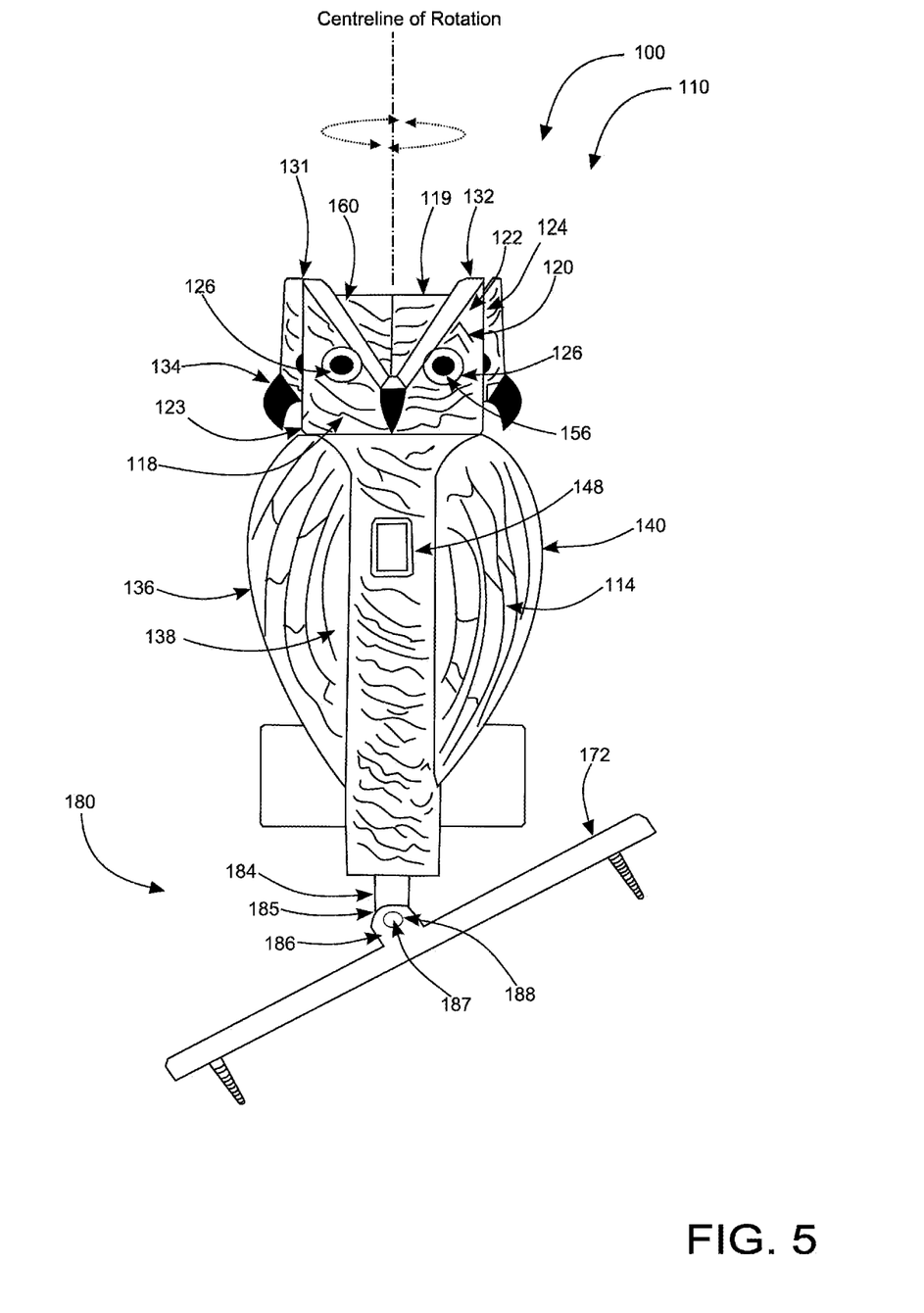
FIG. 5 shows a perspective view illustrating the deterrent assembly at an incline of the pest deterrent system according to an embodiment of the present invention.

Referring to the drawings by numerals of reference there is shown in FIG. 1, pest deterrent system 100 in 'in-use' condition 106 according to an embodiment of the present invention.

Pest deterrent system 100, as disclosed herein, preferably comprises: deterrent assembly 110 including housing 114 having head portion 118 (including at least two eyes 126, at least two ears 130, and beak 134); body portion 136; left wing 138; right wing 140; left foot 142; right foot 144; at least one motion sensor 148; at least one speaker 152; a plurality of illuminators 156; at least one powerer 160; electrical wiring 164 (as required); at least one power storer 168; adjustable mounting plate 172; a plurality of fasteners 176; elevated stand assembly 180 (having crossbar 182; elevating-rod 184; at least one mounting lug 186; and through-pin 188).

Deterrent assembly 110 comprises in combination: housing 114, at least one motion sensor 148, at least one speaker 152, plurality of illuminators 156, powerer 160, electrical wiring 164, at least one power storer 168, adjustable mounting plate 172, and elevated stand assembly 180. Further, deterrent assembly 110 of pest deterrent system 100 is useful to emit audible sounds via at least one speaker 152, and illumination via the illuminators 156 and appear as bird of prey such that pests 190 are visually and sound deterred from remaining within a vicinity of a location of deterrent assembly 110. Deterrent assembly 110 is adjustable, and operated via natural ambient sources as shown in in-use condition 106 of FIG. 1.

Housing 114 in combination comprises head portion 118, body portion 136, left wing 138, right wing 140, left foot 142, and right foot 144. Housing 114 preferably resembles a bird of prey, as previously mentioned. The bird of prey comprises owl 194 in the preferred embodiments. Pests 190 may include but are not limited to pigeons, doves, grackles, blackbirds, and other flocking birds as shown in FIG. 1. These pests 190 have a genetic, avoidance response to owls 194, therefor these pests 190 will no longer be a problem when deterred, or leave behind their mess on planar surfaces 174 (vertical and horizontal surfaces) and other surrounding objects. Other pests such as rodents may be deterred to prevent the spread of mess and disease(s).

Referring generally now to FIGS. 2-5 showing various perspective views of deterrent assembly 110 of pest deterrent system 100 according to an embodiment of the present invention.

Head portion 118 of housing 114 preferably comprises at least two eyes 126, at least two ears 130, and beak 134 resembling the bird of prey such that pests 190 are visually deterred. Head portion 118 of housing 114 further comprises top surface 119, front face 120, back surface 121, front surface 122, left side 123 and right side 124; at least two eyes 126, and beak 134 are located on front face 120. The at least two ears 130 comprise left ear 131 and right ear 132, the left ear 131 adjacent left side 123 and right ear 132 adjacent right side 124. The at least two eyes 126 are illuminatable via the plurality of illuminators 156. The plurality of illuminators 156 comprise yellow LEDs as shown best in FIG. 4. The at least one motion sensor 148 is located on front surface 122 of head portion 118. Head portion 118 rotates 360 degrees or portion thereof. The rotation is toward a direction from which motion was sensed.

At least one motion sensor 148 is useful to send a signal to activate a plurality of illuminators 156 and at least one speaker 152 when motion from pests 190 is sensed; at least one speaker 152 able to emit audible sound(s). The audible sound may comprise a frequency of less than 20,000 Hz wherein a human is able to hear the audible sound emitted from at least one speaker 152. The audible sound may comprise a frequency of greater than 20,000 Hz wherein a human is unable to hear the audible sound emitted from at least one speaker 152. For example the audible sound comprising hoot (ing) noises are emitted via at least one speaker 152 at less than 20,000 Hz. The frequency may be conditioned as per the size of the pest or may be manually settable; for example if it is to scare off a dog such as a coyote a frequency of greater than 20,000 Hz may be used. In this way using a frequency of greater than 20,000 Hz other humans are not disturbed by noises since they cannot hear them.

Powerer 160 preferably provides power for operating deterrent assembly 110. At least one power storer 168 stores the power for operating deterrent assembly 110. Powerer 160 is mounted on top surface 119 of head portion 118 as shown best in FIG. 3. Powerer 160 preferably comprises at least one solar panel 162. Further, at least one power storer 168 comprises rechargeable batteries (not shown). Electrical wiring 164 preferably allows at least one power storer 168 to be in electrical communication with powerer 160.

Adjustable mounting plate 172 preferably allows deterrent assembly 110 to be mounted to planar surface 174. Planar surface 174 may comprise a (substantially) horizontal surface. The horizontal surface may include but is not limited to a roof, a fence, a table, or a balcony for example. Further, planar surface 174 may comprise a vertical surface. The vertical surface may include but is not limited to a wall or a tree trunk for example. Fasteners 176 may be used for removably affixing adjustable mounting plate 172 to planar surface 174.

Elevated stand assembly 180 preferably comprises in combination crossbar 182, elevating-rod 184, at least one mounting lug 186; and through-pin 188. Additionally, elevating-rod 184 further comprises swivel 185 as shown best in FIG. 5. Swivel 185 may comprise a ball and socket or other suitable equivalent. The left foot 142 and right foot 144 sit in crossbar 182. Elevated stand assembly 180 sits above a top surface of adjustable mounting plate 172. At least one mounting lug 186 comprises a through-aperture 187 allowing through-pin 188 to pass through elevating-rod 184. Elevating-rod 184 is attached to crossbar 182; crossbar 182 holding deterrent assembly 110 in an elevated position relative to adjustable mounting plate 172. Deterrent assembly 110 is able to be pivoted in relation to adjustable mounting plate 172 via elevating-rod 184, through-pin 188 able to rotate within mounting lug(s) 186. In this way the present invention may be directed towards a known problem area for pests (as evidenced by droppings or the like). Use of the device helps promote public health.

Figure 6:
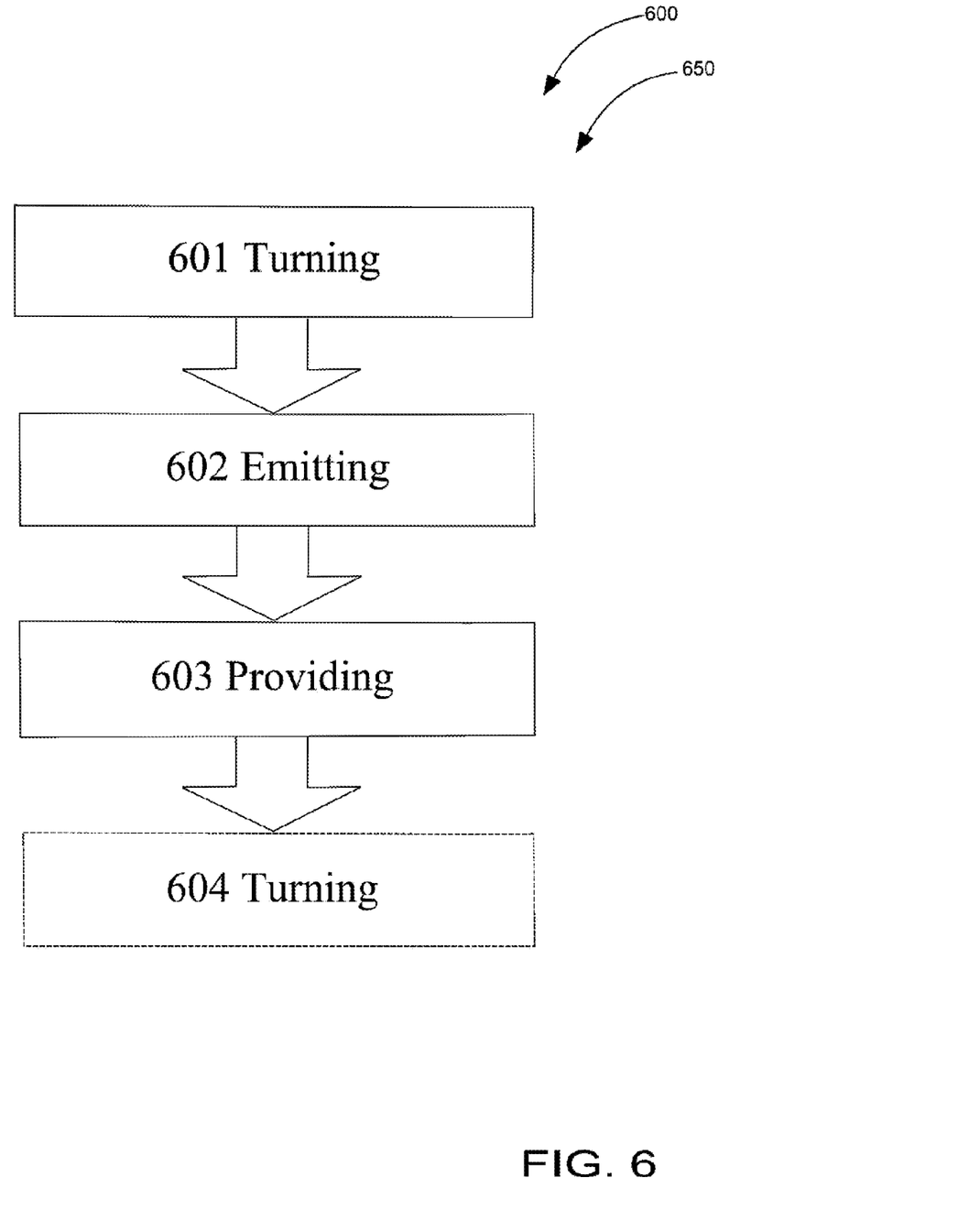
FIG. 6 is a flowchart illustrating a method of use for the pest deterrent system according to an embodiment of the present invention of FIGS. 1-5.

Referring now to FIG. 6 showing flowchart 650 illustrating method of use 600 for pest deterrent system 100 according to an embodiment of the present invention of FIGS. 1-5.

A method of using (at least herein enabling method of use 600) pest deterrent system 100 may comprise the steps of: step one 601 turning on powerer 160 that provides power for operating deterrent assembly 110, deterrent assembly 110 locating prey within a vicinity of a location of deterrent assembly 110 (via sensors); step two 602 emitting audible sounds including a hoot via at least one speaker 152 and appearing as a bird of prey such that pests 190 are sound deterred from remaining within the vicinity of the location of deterrent assembly 110; step three 603 providing illumination via illuminators 156 to appear as the bird of prey such that pests 190 are visually deterred from remaining within the vicinity of the location of deterrent assembly 110; and step four 604 (optionally) manually turning off powerer 160 on deterrent assembly 110.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pest deterrent system comprising:
   a deterrent assembly including;
      a housing having;
         a head portion including;
            at least two eyes;
            at least two ears; and
            a beak;
         a body portion;
         a left wing;
         a right wing;
         a left foot; and
         a right foot;
      at least one motion sensor;
      at least one speaker;
      a plurality of illuminators;
      a powerer;
      electrical wiring;
      at least one power storer;
      an adjustable mounting plate;
      an elevated stand assembly having;
         a crossbar;
         an elevating-rod;
         at least one mounting lug; and
         a through-pin;
   wherein said deterrent assembly comprises in combination said housing, said at least one motion sensor, said at least one speaker, said plurality of illuminators, said powerer, said electrical wiring, said at least one power storer, said adjustable mounting plate, said elevated stand assembly;
   wherein said housing in combination comprises said head portion, said body portion, said left wing, said right wing, said left foot, and said right foot;
   wherein said housing resembles a bird of prey;
   wherein said head portion of said housing comprises said at least two eyes, said at least two ears, and said beak resembling said bird of prey such that pests are visually deterred;
   wherein said head portion of said housing further comprises at least a top surface, a front face, a back surface, a front surface, a left side and a right side;
   wherein said at least two eyes, and said beak are located on said front face;
   wherein said at least two ears comprise a left ear and a right ear, said left ear adjacent said left side and said right ear adjacent said right side;
   wherein said at least two eyes are illuminatable via said plurality of illuminators;
   wherein said at least one motion sensor is useful to send a signal to activate said plurality of illuminators and said at least one speaker when motion from said pests is sensed, said at least one speaker able to emit an audible sound;
   wherein said powerer provides power for operating said deterrent assembly;
   wherein said at least one power storer stores said power for operating said deterrent assembly;
   wherein said electrical wiring allows said at least one power storer to be in electrical communication with said powerer;

wherein said adjustable mounting plate allows said deterrent assembly to be mounted to a planar surface;
wherein said elevated stand assembly comprises in combination said crossbar, said elevating-rod, said at least one mounting lug; and said through-pin;
wherein said left foot and said right foot sit on said crossbar;
wherein said elevated stand assembly sits above a top surface of said adjustable mounting plate;
wherein said at least one mounting lug comprises a through-aperture allowing said through-pin to pass through said elevating-rod, said elevating-rod attached to said crossbar, said crossbar holding said deterrent assembly is an elevated position relative to said adjustable mounting plate;
wherein said deterrent assembly is able to be pivoted in relation to said adjustable mounting plate via said elevating-rod, said through-pin able to rotate within said mounting lug(s); and
wherein said deterrent assembly of said pest deterrent system is useful to emit audible sounds via said at least one speaker, and illumination via said illuminators and appear as said bird of prey such that said pests are visually and sound deterred from remaining within a vicinity of a location of said deterrent assembly, said deterrent assembly adjustable, and operated via natural ambient sources.

2. The pest deterrent system of claim 1 wherein said powerer is mounted on said top surface of said head portion.

3. The pest deterrent system of claim 1 wherein said powerer comprises at least one solar panel.

4. The pest deterrent system of claim 3 wherein said audible sound comprises a frequency of less than 20,000 Hz wherein a human is able to hear said audible sound emitted from said at least one speaker.

5. The pest deterrent system of claim 3 wherein said audible sound comprises a frequency of greater than 20,000 Hz wherein a human is unable to hear said audible sound emitted from said at least one speaker.

6. The pest deterrent system of claim 1 wherein said planar surface comprises a horizontal surface.

7. The pest deterrent system of claim 1 wherein said planar surface comprises a vertical surface.

8. The pest deterrent system of claim 1 wherein said bird of prey comprises an owl.

9. The pest deterrent system of claim 1 further comprising fasteners for removably affixing said adjustable mounting plate to said planar surface.

10. The pest deterrent system of claim 1 wherein said at least one power storer comprises rechargeable batteries.

11. The pest deterrent system of claim 1 wherein said elevating-rod further comprises a swivel.

12. The pest deterrent system of claim 11 wherein said swivel comprises a ball and socket.

13. The pest deterrent system of claim 1 wherein said plurality of illuminators comprise LEDs.

14. The pest deterrent system of claim 13 wherein said LEDS are yellow.

15. The pest deterrent system of claim 1 wherein said at least one motion sensor is located on said front surface of said head portion.

16. The pest deterrent system of claim 1 wherein said head portion rotates about 360 degrees causing a rotation.

17. The pest deterrent system of claim 16 wherein said rotation is toward a direction from which motion was sensed.

18. The pest deterrent system of claim 1 wherein said audible sound comprises hoot noises emitted via said speaker.

19. A pest deterrent system comprising:
a deterrent assembly including;
  a housing having;
    a head portion including;
      at least two eyes;
      at least two ears; and
      a beak;
    a body portion;
    a left wing;
    a right wing;
    a left foot; and
    a right foot;
  at least one motion sensor;
  at least one speaker;
  a plurality of illuminators;
  a powerer;
  electrical wiring;
  at least one power storer;
  an adjustable mounting plate;
  a plurality of fasteners;
  an elevated stand assembly having;
    a crossbar;
    an elevating-rod;
    at least one mounting lug; and
    a through-pin;
wherein said deterrent assembly comprises in combination said housing, said at least one motion sensor, said at least one speaker, said plurality of illuminators, said powerer, said electrical wiring, said at least one power storer, said adjustable mounting plate, said elevated stand assembly;
wherein said housing in combination comprises said head portion, said body portion, said left wing, said right wing, said left foot, and said right foot;
wherein said housing resembles a bird of prey;
wherein said bird of prey comprises an owl;
wherein said head portion of said housing comprises said at least two eyes, said at least two ears, and said beak resembling said bird of prey such that pests are visually deterred;
wherein said head portion of said housing further comprises a top surface, a front face, a back surface, a front surface, a left side and a right side;
wherein said at least two eyes, and said beak are located on said front face;
wherein said at least two ears comprise a left ear and a right ear, said left ear adjacent said left side and said right ear adjacent said right side;
wherein said at least two eyes are illuminatable via said plurality of illuminators;
wherein said plurality of illuminators comprise LEDs;
wherein said LEDS are yellow;
wherein said at least one motion sensor is useful to send a signal to activate said plurality of illuminators and said at least one speaker when motion from said pests is sensed, said at least one speaker able to emit an audible sound;
wherein said audible sound comprises a frequency of less than 20,000 Hz wherein a human is able to hear said audible sound emitted from said at least one speaker;
wherein said audible sound comprises hoot noises emitted via said speaker;
wherein said at least one motion sensor is located on said front surface of said head portion;
wherein said head portion is able to rotate about 360 degrees;
wherein a rotation is toward a direction from which motion was sensed;

wherein said powerer provides power for operating said deterrent assembly;

wherein said at least one power storer stores said power for operating said deterrent assembly;

wherein said powerer is mounted on said top surface of said head portion;

wherein said powerer comprises at least one solar panel;

wherein said at least one power storer comprises rechargeable batteries;

wherein said electrical wiring allows said at least one power storer to be in electrical communication with said powerer;

wherein said adjustable mounting plate allows said deterrent assembly to be mounted to a planar surface;

wherein said planar surface comprises a horizontal surface;

wherein said fasteners are used for removably affixing said adjustable mounting plate to said planar surface;

wherein said elevated stand assembly comprises in combination said crossbar, said elevating-rod, said at least one mounting lug; and said through-pin;

wherein said elevating-rod further comprises a swivel;

wherein said swivel comprises a ball and socket;

wherein said left foot and said right foot sit on said crossbar;

wherein said elevated stand assembly sits above a top surface of said adjustable mounting plate;

wherein said at least one mounting lug comprises a through-aperture allowing said through-pin to pass through said elevating-rod, said elevating-rod attached to said crossbar, said crossbar holding said deterrent assembly is an elevated position relative to said adjustable mounting plate;

wherein said deterrent assembly is able to be pivoted in relation to said adjustable mounting plate via said elevating-rod, said through-pin able to rotate within said mounting lug(s); and wherein said deterrent assembly of said pest deterrent system is useful to emit said audible sounds via said at least one speaker, and illumination via said illuminators and appear as said bird of prey such that said pests are visually and sound deterred from remaining within a vicinity of a location of said deterrent assembly, said deterrent assembly adjustable, and operated via natural ambient sources.

* * * * *